United States Patent [19]

Hasegawa et al.

[11] Patent Number: 4,879,334
[45] Date of Patent: Nov. 7, 1989

[54] ORGANOPOLYARYLSILANES, PROCESS FOR MANUFACTURING THE SAME AND FIBERS COMPRISING THE SAME

[75] Inventors: Yoshio Hasegawa, Higashi; Kiyohito Okamura, Mito, both of Japan

[73] Assignee: The Foundation: The Research Institute for Special Inorganic Materials, Ibaraki, Japan

[21] Appl. No.: 131,139

[22] PCT Filed: Mar. 10, 1987

[86] PCT No.: PCT/JP87/00147
§ 371 Date: Nov. 6, 1987
§ 102(e) Date: Nov. 6, 1987

[87] PCT Pub. No.: WO87/05612
PCT Pub. Date: Sep. 24, 1987

[30] Foreign Application Priority Data

Mar. 11, 1986 [JP] Japan .................................. 61-51397
Mar. 11, 1986 [JP] Japan .................................. 61-51398

[51] Int. Cl.⁴ ............................................ C08F 283/00
[52] U.S. Cl. ...................................... 525/474; 501/88; 501/90; 501/95; 264/29.2; 264/59; 528/10; 524/66
[58] Field of Search ............................ 501/88, 90, 95; 264/29.2, 59; 524/66; 528/10; 525/474

[56] References Cited

U.S. PATENT DOCUMENTS 4,324,901 4/1982 West et al. ........................... 556/430
4,544,729 10/1985 Nate et al. .............................. 528/28
4,618,591 10/1986 Okamura et al. .................... 428/367

FOREIGN PATENT DOCUMENTS 59-144621 8/1984 Japan .

OTHER PUBLICATIONS

Chemical Dictionary, pp. 300, 301, and 398, Netherlands University Press, N.V. Amsterdam, 1961.
West et al., Polysilastyrene: Phenylmethylsilane-Dimethylsilane Copolymers as Precursors to Silicon Carbide, Ceramic Bulletin, 62, pp 899–903, (1983).
Hasegawa et al., Synthesis of Precursors for Si–C Fibers by Copyrolysis of Polysilane and Pitch, J. Ceram. Jpn. Inter. Ed., vol 95, (92–96),(1987).

Primary Examiner—Melvyn I. Marquis
Attorney, Agent, or Firm—Stevens, Davis, Miller & Mosher

[57] ABSTRACT

The invention relates to an organopolyarylsilane which comprises aromatic ring segments having a skelton mainly comprising an aromatic condensed ring structure derived from an organic solvent soluble pitch and organosilane segments randomly bonded thereto with an Si—C linkage intervening therebetween and is soluble in an organic solvent, and further relates to an SiC—C based continuous inorganic fiber exhibiting excellent heat resistant strength, oxidation resistance and electro-conductivity, which is obtained by spinning the above organopolyarylsilane into fiber, and after infusibilizing, heat-treating said fiber under a nonreactive atmosphere at a high temperature. The above organopolyarylsilane can be efficiently obtained in extremely high yields, by a process wherein low boiling substances produced by pyrolysis of the starting material, i.e., polysilane, and low boiling fractions in the pitch are reacted in a gaseous phase and refluxed to a liquid phase, so that the invention contributes towards an effective utilization of the pitches.
Further, the above fibers are useful as reinforcements for composite materials, electric or electronic materials, and heat-resistant materials or structural components relating to aerospace and aviation.

23 Claims, No Drawings

ORGANOPOLYARYLSILANES, PROCESS FOR MANUFACTURING THE SAME AND FIBERS COMPRISING THE SAME

DESCRIPTION

Technical field

The present invention relates to organopolyarylsilanes comprising aromatic rings in the main chain, particularly, co-pyrolytic condensates of a polysilane and a pitch; a process for manufacturing the same; and novel SiC—C based continuous inorganic fibers produced by spinning such an organopolyarylsilane into fibers and then after infusibilizing, heat-treating the fibers under a non-reactive atmosphere.

Background art

Polysilanes are compounds having a skeleton composed of Si—Si linkages. As the polysilanes having organic groups are converted by pyrolysis into polymers having SiC—C linkages in the skelton which are further converted into SiC, that is, an inorganic compound, they have been used as a starting material for SiC, while pitches have been used as a starting material for various carbon articles.

In hitherto known processes for synthesizing SiC from an organosilicon compound such as organopolysilanes or the like, there is a so-called precursor process wherein a polymer is synthesized and then heat-treated. This process is very advantageous in the case where an organosilicon compound is utilized as a starting material for fibers, binders for various ceramics, films, paints and impregnating agents. Therefore, polysilanes or polycarbosilanes produced therefrom by pyrolytic condensation, have been synthesized. The polysilanes are described, for example, in Ceram. Bull. 62, p. 899, (1983), and the polycarbosilanes obtained by pyrolytic condensation of polysilanes are in the Gazettes of Japanese Patent Application Laid-open Nos. 51-126,300, 52-74,000, 52-112,700, 54-61,299, 57-16,029 and 58-136,626. These organosilicon polymers, i.e., organopolysilanes are used as a precursor for inorganic compounds mainly comprising SiC and, in that case, an excess of carbon always exists in the resulting inorganic compounds. In the case where these polymers are used, notwithstanding this carbon seriously affects the characteristics of the resulting inorganic compounds, yet it has heretofore been impossible to arbitrarily control the carbon content to any desired values. In the meantime, carbon materials obtained by using pitches as a precursor, have excellent characteristics, as represented by carbon fibers, and they are however poor in air-oxidation resistivity. In order to obviate this drawback, extensive researches have been conducted on compounding of carbon and ceramics.

In spite of such circumstances, the reason why there have not so far been any precursors that can provide, by heat treatment, an SiC-carbon composite material having a controlled carbon content is because the polysilanes or polycarbosilanes are poor in compatibility with pitches, so that syntheses of such a composite material have had to depend on a process wherein powder of an inorganic substance is employed.

Further, as hitherto known fibers, there have been continuous fibers whose starting materials are polymers obtained by pyrolytic polymerization of an organosilicon compound, as disclosed in the Gazettes of Japanese Patent Application Laid-open Nos. 51-139,929, 51-130,324, 51-130,325, 51-149,925, 51-149,926, 51-147,623, 51-147,624, 52-1,136, 52-5,321, 52-31,126, 52-103,529, 52-59,724, 52-63,427, 52-70,122, 52-96,237, 52-103,529, 53-103,025 and 54-82,435. In the meantime, carbon fibers are obtainable by using rayons, polyacrylonitriles, pitches or the like, as a starting material. A great many of these fibers, and manufacturing processes and applications thereof have been applied for a patent, and some of them have been industrially under mass-production. However, though the formers are excellent in heat resistance, oxidation resistance and compounding properties with metals, they have had various drawbacks, such as low electroconductivities, that is, a volume resistivity of about $10^2$ $\Omega\cdot$cm, and difficulties in control thereof. Also, in the aspect of mechanical properties, the quality control by changing composition is almost impossible, for example, the control of the tensile modulus of elasticity has to depend upon heat treatment temperatures. Further, they are expensive. In the meanwhile, though the latters have features such as high heat resistances, good electroconductivities and excellent compounding properties with plastics, they are poor in air-oxidation resistance and involved in problems with respect to reactivity in the case of compounding with metals, particularly in the case where the starting materials is a pitch, the use of a specially treated pitch is required in order to provide fibers having excellent characteristics, so that they have not always been economical.

DISCLOSURE OF INVENTION

We, the inventors, as a result of assiduous studies conducted to overcome the above-mentioned problems have found out a process wherein a precursor providing an SiC-carbon composite material having an arbitrarily controlled carbon content can be synthesized within a relatively short time in high yields. Using such a precursor, i.e., an organopolyarylsilane, we have succeeded in obviating the aforementioned drawbacks of the conventional SiC fibers or carbon fibers and in providing excellent, novel SiC—C based continuous inorganic fibers having hitherto unknown new mechanical and electrical properties, etc. Namely, it has been found that the fibers obtained by heat-treating the fibers spun from the above-described organopolyarylsilanes as a spinning material, have an electroconductivity between those of SiC fibers and carbon fibers and, moreover, that their composition is arbitrarily controllable, so that not only are their electroconductivities and mechanical properties controllable over a wide range but also they are superior in air-oxidation resistivity to the carbon fibers. The present invention has been accomplished based on the above findings.

The process of the present invention to obtain the above-mentioned organopolyarylsilanes is characterized by mixing a polysilane with an organic solvent soluble pitch and heating the mixture under an inert atmosphere to effect co-pyrolytic condensation. According to such a process of the invention, there is provided an organopolyarylsilane which is characterized in that aromatic ring segments having a skelton mainly comprising an aromatic condensed ring structure and organosilane segments having a skelton mainly comprising carbosilane and polysilane structures are randomly bonded to each other with a silicon-carbon linkage intervening therebetween and further characterized by being soluble in organic solvents.

One of the starting materials to be employed in the process for manufacturing the organopolyarylsilanes according to the present invention is a polysilane having a structure of:

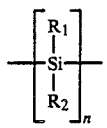

which may be a cyclic or ramified polysilane. In the above formula, n may be a number not smaller than 2, and $R_1$ and $R_2$ are hydrogen, halogen, an alkyl group having up to 6 carbon atoms or an aryl group having up to 12 carbon atoms, respectively. Particularly preferred are polysilanes wherein 50% or more of $R_1$ and $R_2$ are methyl groups or, in the case where a mixture of polysilanes is used, 50% or more of all $R_1$ and $R_2$ are methyl groups. These polysilanes can be synthesized by any of known processes.

Pitches, i.e., another starting material to be employed in the present invention, are solid or semisolid ones having a skelton composed mainly of aromatic condensed rings, obtained by pyrolysis of organic materials such as ordinary coals, petroleum or the like. For example, coal-tar pitches and petroleum pitches can be employed. The pitches that are soluble in ordinary organic solvents, such as benzene, toluene, xylene, tetrahydrofuran and the like, are preferred. Of course, pitches which contain solvent insoluble matter also can be used and, however, when solvent insoluble impurities are removed from the produced polymers after the synthesis thereof, solvent insoluble products produced from the components contained in the solvent insoluble pitches are also removed together with the impurities. Further, as will be described hereinafter, the yield in synthesis is lowered by these insoluble materials. Alternatively, as a pitch stimulant, compounds having aromatic condensed rings, for example, tars, etc., which are in liquid form at room temperature also can be used. Further, isolated aromatic compounds also can be used but these are not economical.

In the process for manufacturing organopolyarylsilanes in accordance with the present invention, 100 parts by weight of at least one kind of the aforementioned polysilanes are mixed with 2~500 parts by weight of the aforementioned pitch and their mixture is co-pyrolytically condensed by heating under an atmosphere inert to the reaction.

The most preferable embodiment of the process of the present invention is, as a method for co-pyrolytically condensing the mixture, to perform the reaction both in liquid and gaseous phases. Namely, the reaction apparatus comprises a reaction vessel wherein the reaction takes place in the liquid phase and a reaction tower wherein vapor of the mixture produced in the reaction vessel and vapors of low-boiling constituents formed by pyrolysis of the mixture are maintained at or heated up to temperatures higher than the reaction temperature in the reaction vessel and reacted in the gaseous phase. The vapor and products that have passed through the reaction tower is cooled and returned again to the reaction vessel.

Namely, in the manufacturing process according to the present invention, since the pyrolytic condensation takes place both in the liquid and gaseous phases, the reaction rapidly proceeds and, at the same time a problem in the conventional polycarbosilane synthesis having been carried out by pyrolytic condensation of polysilanes, that is, the problem of low yields of polymers due to the existence of low molecular weight gas phase portions can be resolved. Thus, organopolyarylsilane polymers can be obtained in high yields, even when the added pitch is small in amount.

It is necessary to carry out the co-pyrolytic condensation reaction under an inert gas atmosphere such as preferably nitrogen, argon or the like atmosphere. Further, the reaction is preferred to be carried out in the gas stream under a normal pressure. It is desired to take measures for preventing temperature rise or pressure increase caused by gases, such as hydrogen, produced during the reaction.

Further, the heating temperature in the reaction vessel, i.e., the reaction zone in the liquid phase, is 300°~500° C. If it is lower than 300° C., the pyrolytic condensation of the starting materials hardly proceeds, while if higher than 500° C., thermal decomposition or gellation of the products takes place, which is not preferred. Besides, the temperature in the reaction tower is 300°~800° C. This temperature varies depending upon the kind of the starting materials and, the lower the boiling point of the pyrolysis product is, the higher should it be. In general, if it is higher than 800° C., inorganic substances are produced in the reaction tower, while if lower than 300° C., only reflux occurs due to cooling, so that not only will an effective pyrolysis not take place, but the temperature in the reaction vessel is lowered, and, therefore, it is not preferred. It is desired to maintain the temperature in the reaction tower at least the same as or higher than that in the reaction vessel.

Furthermore, the reaction time, in general, may be relatively as short as 1~10 hours after a predetermined temperature has been reached. There may be the case, depending on the starting materials, where a longer time is required.

The polymers obtained by the above co-pyrolytic condensation are dissolved in a solvent, filtered to remove insoluble matter therefrom and then can be purified by removing the solvent. If required, their molecular weight can be adjusted by removing low molecular weight materials by distillation under a normal pressure or reduced pressure, or by fractionating with solvents.

The important and novel feature of the thus obtained organopolyarylsilanes according to the present invention is that organosilane polymer segments having a carbosilane or polysilane skelton which is originally poor in compatibility and aromatic ring segments of pitch having an aromatic condensed ring skelton, are randomly bonded to each other and comprised in one molecule by means of co-pyrolytic condensation. As explained hereinbefore, notwithstanding the polycarbosilanes and pitches are useful precursors for inorganic materials, they have respective shortcomings. The polymers according to the present invention cover up those shortcomings and, moreover, realization of new functions is expected thereupon. The functions of the process of the present invention and the polymers obtained according thereto will be explained hereinafter.

The polysilanes, i.e., one of the starting materials in the process for manufacturing organopolyarylsilanes of the present invention, usually begin pyrolysis at 200° C. or higher and are converted, via low molecular weight polysilanes, into polymers having a carbosilane skelton.

The lower the molecular weight of the polysilanes, the higher the temperature for the pyrolysis to begin, and, for example, for hexamethyl disilane, about 600° C. is required. In the meantime, in the pitches, aromatization and an increase in aromatic rings are observed at about 300 ~400° C. Hence, in the case where the polysilanes are mixed with the pitches and heated, the reaction proceeds when their pyrolysis temperatures are in accord with each other. This reaction is an inter-reaction between their intermediates formed by decomposition, which is considered to be promoted by pyrolysates of the polysilanes. It is because that, for example, when only toluene soluble matter of a petroleum pitch is heated to 400° C., aromatization and an increase in aromatic rings occur, finally resulting in an increase in toluene insoluble matter, but no increases in molecular weight and number of rings occur, whereas if polysilanes exist therein, the increases in molecular weight and number of rings occur and, besides, little toluene insoluble matter is produced. However, if more than 500 parts by weight of the pitch are added to 100 parts by weight of the polysilane, the formation of insoluble matter is appreciably increased by polymerization of the pitch only. Further, when the pitch is less than 2 parts by weight, formation of organopolysilane polymers free from condensed aromatic rings of the pitch component will begin, so that as described hereinabove, it is desired to add 2~500 parts by weight of the pitch to 100 parts by weight of the polysilane.

It has not definitely been elucidated, with which part of the pyrolysates of the polysilane, the pitches react and, however, the comparison of infrared absorption spectra between the polymers of the present invention and the pyrolytic condensates of only polysilane shows that the polymer of the present invention has a less amount of Si—H bonds produced by pyrolysis of polysilanes and accordingly it suggests that the reactions,

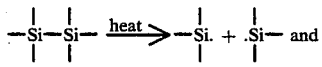

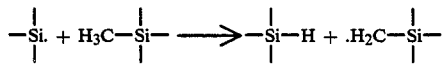

take place in the absence of pitches, while the reaction,

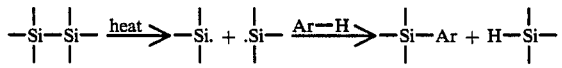

takes place in the presence of pitches (when Ar of Ar—H is an aromatic condensed ring). It is apparent from ultraviolet absorption spectra that, in the co-pyrolytic condensation with polysilanes, the increase in the number of the rings is restrained at the pitch portions and it has been formed that the polymer of this invention is produced, forming Si—Ar bonds. However, as was explained hereinabove, the polysilanes produce a large quantity of low boiling matter by the pyrolysis and, moreover, low boiling materials are also contained in the pitches, so that in the co-pyrolytic condensation reaction according to the present invention, if the mixture is only heated, either the reaction rate is so low that the reaction requires a long time or an uneven reaction occurs due to a difference of the solubility in the produced low boiling materials, or yields are lowered due to removal of the low boiling materials. In the most preferred embodiments of the process for manufacturing organopolyarylsilanes according to the invention, since the aforementioned reaction tower is used wherein even such low boiling materials are co-pyrolytically condensed, the above problems have been resolved completely, succeeding in using polysilanes and pitches having any molecular weight as starting materials, by reacting them in the gaseous phase at a high temperature in the reaction tower and those having molecular weights increased to some extent having refluxed to the liquid phase in the reaction vessel.

Next, the structure of the polymers of the present invention will be explained. The infrared absorption spectra of the obtained polymers show an Si—CH$_2$—Si bond (1,020 cm$^{-1}$) that shows the polymers have carbosilane bonds. Further, the nuclear magnetic resonance spectra show the existence of Si—Si bonds, i.e., polysilane bonds. Though atomic ratios of silicons constituting the carbosilane bond and polysilane bond depend on the reaction temperature, the silicon atoms constituting the carbosilane bonds are 100~20% and decrease as the reaction temperature falls. It has been found from the measurement of the viscosity that the organosilane segments having a skelton portion mainly comprising these carbosilane bonds and polysilane bonds have a planar structure wherein ring structures and chain structures are mixed. Further, the molecular weight of this portion decreases according as the rate of the pitches increases, which varies over about 60~10,000. Even if about 60, it has a serious meaning in the case of the polymers of the invention, that is, for example, by an intermolecular condensation, the pitches increase their molecular weight and are insolubilized in solvents, while the structure wherein the pitch molecules are cross-linked, for example, with —SiMe$_2$—, remains soluble in solvents even if the molecular weight increases.

In the meanwhile, in the segment skelton produced from the pitch component in the polymers of the invention, noticeable structural changes are not perceived from the infrared absorption spectra or nuclear magnetic resonance spectra. From the fact that, in the ultraviolet absorption spectra, the absorption end moves little by little towards the long-wave side as well as the absorption intensity increases, according as the pitch component increases its rate, it has been found that increases in aromatization and the number of the rings occur. However, as mentioned above, there is not observed an increase thereby in solvent-insoluble matter such that occurs in the pyrolytic condensation of pitches only, which therefore shows the fact that the condensation with pyrolysates of the polysilanes occurs. Further, until the pitch amounts up to 200 parts per 100 parts of polysilanes by weight, the intermolecular condensation of the pitch components is not noticeable. However, when a solvent insoluble matter containing pitch is used as the starting material pitch, the solvent insoluble matter is produced yet in the obtained polymer and, moreover, the reaction yield is lowered more than the deduction of the insoluble matter from the starting material pitch. This fact shows that the with decomposition products of polysilanes but is not solvent-solubialized by the reaction, and it is apparent that the aromatic ring segments constituting the polymers of the present invention have been derived from an organic solvent soluble pitch.

As explained above, the polymers obtained according to the present invention have a structure wherein aromatic ring segments having a skelton mainly comprising aromatic condensed rings and organosilane segments having a skelton mainly comprising carbosilane and polysilane bonds are randomly combined with each other via silicon-carbon linking groups, said aromatic ring segments being derived from an organic solvent soluble pitch. Further, the polymers of the present invention have a number-average molecular weight of 500 ~ 10,000, preferably 600 ~ 4,000, besides, when they are heat-treated under a non-oxidizing atmosphere, the percentage of residue is high, and they melt upon heating, or dissolve in a solvent such as benzene, toluene, xylene, tetrahydrofuran and the like, so that they can be employed as a precursor in ceramic syntheses by precursor processes. The polymers of the present invention are promising in effective utilization of pitches as well as syntheses of ceramics having new functions.

The present invention further includes an SiC—C based continuous inorganic fiber which is characterized by being produced by spinning into a fiber a spinning liquid of an organopolyarylsilane, that is, a polymer obtained by a process as explained above, infusibilizing the obtained spun fiber, and heat-treating the infusibilized fiber under a non-reactive atmosphere such as a vacuum or an inert gas atmosphere, at a temperature ranging from 800° to 3,000° C.

Further, such an SiC—C based continuous inorganic fiber comprises molecules having, as main structural components, an amorphous and/or crystalline carbon and an amorphous and/or crystalline SiC; has a composition comprising 5~55% by weight of silicon, 40~95% by weight of carbon and 0.01~15% by weight of oxygen; is excellent in heat resistance and oxidation resistance; and exhibits a volume resistivity of $10 \sim 10^{-3}$ Ω·cm.

The process of fiber-formation from the abovedescribed organopolyarylsilane comprises a spinning step, an infusibilizing step and a heat-treating step.

At the outset, in the spinning step, the above polymer is heat-melted to prepare a spinning liquid which is spun into fibers by a conventional melt-spinning apparatus. During the spinning, the spinning liquid has a temperature ranging from 100° to 400° C., though it differs depending on the softening temperature of the starting polymer. A fine fiber having a small diameter can be obtained by increasing the take up speed and, in general, good results can be obtained in the range between 50 m/min. and 5,000 m/min. Besides the above melt-spinning processes, the polymers can be dissolved in a solvent, such as benzene, toluene and the like, to prepare a spinning solution and spun into fibers by a conventional dry-spinning apparatus and, however, the melt-spinning is easier.

In the spinning step, as the above organopolyarylsilane polymers are used, there will never be encountered difficulties, such as that when, for example, an organosilicon polymer and a pitch are mixed together and blend-spun, a uniform blending in a molecular level cannot be effected due to their low compatibility so that not only are uneven fibers produced but also, in an extreme case, the spinning operation cannot be carried out. Besides, when the mixture is used as a starting material, each constituent must be controlled so as to have characteristics suitable for the subsequent infusibilizing and heat-treating steps, and the control-treatments therefore further lower their compatibilities.

Next, in the infusibilizing step, the above spun fibers are subjected to an oxidation treatment under an oxidizing atmosphere at a temperature ranging between room temperature and 350° C., and the above spun fibers are infusibilized. The object of this oxidation treatment is to cross-link the molecules of the starting materials forming the spun fibers, so that fibers may not fusion bond with each others during the heat-treating step that will be described hereinafter. As the oxidizing atmosphere, at least one kind of gaseous atmosphere selected from air, oxygen, ozone and halogen gases is preferred. Temperatures exceeding 350° C. are not preferred because the oxidation proceeds too far.

The duration of the above oxidation treatment which relates to the above temperature, may be a short time in the high temperature zone and requires a long time in the low temperature zone. In most cases, the temperature rise rate up to the predetermined temperature is 5° C.~50° C./hour and the retention time at the predetermined temperature of 2 hours or less is enough.

Further, besides the above infusibilizing step wherein the treatment is carried out under an oxidizing atmosphere, the spun fibers can be infusibilized by irradiation of ultraviolet-light, γ rays or electron rays under an oxidizing or non-oxidizing atmosphere at a temperature ranging between room temperature and 350° C. The irradiation conducted under the above oxidizing atmosphere, as it promotes oxidation, is convenient for slow-oxidizing polymers. The object of the irradiation under a non-oxidizing atmosphere such as an inert gas or a vacuum is to cross-link mutually the polymeric molecules forming the spun fibers, to infusibilize them and, particularly, to confine the oxygen content in fibers to a minimal level. An appropriate exposed dose is $10^6 \sim 10^{10} \gamma$.

Next, in the heat-treating step, the above infusibilized fibers are heat-treated at a temperature ranging between 800° and 3,000° C., to provide SiC—C base continuous inorganic fibers. The above heat treatment is carried out under a non-reactive atmosphere, such as a vacuum or an inert gas atmosphere, at a temperature ranging from 800° to 3,000° C., under tension or no tension, and the polymers forming the infusibilized fibers liberate volatile matter produced by the thermal polycondensation reaction and pyrolytic reaction. The volatile matter is mainly produced at 300°~800° C., for which in some cases the above infusibilized fibers may shrink and bend, and however this bending can be prevented by applying a tension during the heat treatment. The application of the tension at high temperatures is also advantageous particularly for the fibers having a large carbon content, as there may be cases that the characteristics of the fibers can be improved. In such a case, the tension is in the range of 0.01 kg~10 kg/mm². If the heat-treating temperature is lower than 800° C., only a small tension can be applied, while if in excess of 800° C., a large tension can be applied as the strength of the fibers is sufficiently high and, generally, with tensions in the above range, good results are obtainable. Further, the above heat treatment can be effected by a multi-stage process wherein conditions such as the atmosphere, temperature, time and the like are varied.

The above-explained SiC—C based continuous inorganic fibers of the present invention have a composition of 5~55 weight % Si, 40~95 weight % C and 0.01 ~15 weight % 0. When the heat-treating temperature is relatively low, there may be the cases where trace amounts of hydrogen are contained and further as small amounts as impurities of nitrogen, sulphur, etc., are also contained. The fibers having such a composition are composed mainly of an amorphous and/or crystalline carbon and an amorphous and/or crystalline SiC. Though there is no clear distinction between an amorphous substance and a crystalline substance, the average size of the crystallites constituting the fibers gradually increases as the heat-treating temperature rises. Additionally, the average crystallite size is influenced by the size of the segments that form the starting material polymers. When the aromatic ring segments are large and the organosilane segments are small in size, the SiC crystallites have an immeasurably small size or hardly augment the size even at high temperatures. In contrast, when the organosilane segments are large in size, the SiC shows a diffraction pattern characteristic of $\beta$-SiC crystals. For example, 100 parts by weight of polydimethylsilane are mixed with 5 parts by weight of a toluene-soluble petroleum pitch to synthesize a polymer, and fibers obtained by spinning the synthesized polymer, infusibilizing the spun fiber in air at 220° C. for 2 hours and then heat-treating in a vacuum at 1,200° C., have the composition of 51.1 weight % Si, 40.0 weight % and 8.9 weight % 0. In the cases where the heat-treating temperature is 900, 1,200 and 1,500° C., the heat-treated fibers have $\beta$-SiC crystallites of about 10, 30 and 70 in size, respectively. Further, at a temperature of 1,400° C. or more, the oxygens bonded with the silicon atoms in the fibers react with carbon, being released as gas, and at the same time, the silicon atoms react with carbons, forming SiC, so that, when the fibers have a high oxygen content, the crystallite size further augments. Alternatively, if the temperature is 1,000° C. or more, $\alpha$-SiC is formed. Since such crystal growth and phase change affect the mechanical properties of the fiber, when a polymer comprising large organosilane segments is used, fibers having excellent mechanical properties are obtainable at a heat-treating temperature of 1,800° C. or less.

In the meantime, in fibers manufactured by using, as the starting material, a polymer comprising large aromatic ring segments, the SiC crystallite size is smaller than the aforementioned values, while a crystallite size obtained from (002) diffraction pattern corresponding to graphite crystals augments as the heat-treating temperature goes up, but does not exceed 100.

One of the features of the SiC—C based continuous inorganic fibers of the present invention lies in the electroconductivity, exhibiting a volume resistivity in the range of $10 \sim 10^{-3}$ $\Omega$·cm. Namely, conventional SiC continuous fibers obtained by heat-treating at 1,400° C. exhibit a volume resistivity of $10^2$ $\Omega$·cm or more, where as the aforementioned SiC—C fibers of the invention exhibit that of about 1 $\Omega$·cm, despite the heat treatment effected at 1,200° C., which is 1/100 or less of that of the conventional fibers.

The above value gradually drops down to about $5 \times 10^4$ $\Omega$·cm according as the C content increases and the heat-treating temperature rises. Such an appreciable decrease in volume resistivity is an unexpectable effect, even when a polymer synthesized by blending a small quantity of pitches in starting materials is used, for example, even if fibers could be obtained from a polymer containing a fine carbon powder blended in an organosilicon polymer, such a phenomenon would never occur at all. This is because, as already explained, the polymers wherein aromatic ring segments and organosilane segments are uniformly blended and bonded together in a molecular level are employed as a starting material. The fibers produced by the heat treatment, therefore, have a very uniform structure. Particularly, when the heat-treating temperature is 1,400° C. or less, both the SiC and C are amorphous and, moreover, each particle size is evidently in a molecular level. Thus, this structure is quite new and can be said a kind of composite in the nanometer level.

The low volume resistivity is caused by the above structure. Furthermore, the SiC—C based continuous inorganic fibers of the present invention are also excellent in mechanical properties. Particularly with respect to the air-oxidation durability, carbon fibers obtained from a usual pitch, etc. begin to be oxidized at about 350° C. and cannot be used at 400° ~ 500° C., nevertheless, though the fibers according to the present invention slightly reduce the tenacity at the initial oxidation stage, they thereafter form surface oxide due to SiC existing therein and stop the reducing of the tenacity particularly in the amorphous region, even by air-oxidation at 500° C. or higher. Therefore, the fibers of the invention can be used in such high temperatures that conventional carbon fibers cannot be used in.

BEST MODE FOR CARRYING OUT THE INVENTION

The best embodiments of the present invention will be explained by way of examples hereinafter.

EXAMPLE 1

Poly(dimethylsilane) obtained by dechlorination polycondensation by using metallic Na of dichlorodimethylsilane in xylene, was mixed with toluene-soluble matter (number-average molecular weight: 320, and carbon content: 92.1%) of a petroleum pitch with the ratios shown in Table 1 and, setting the reaction tower temperature at 575° C., a synthesis was carried out at a temperature in reaction vessel (reaction temperature) for a reaction time, as shown in Table 1, respectively. After the reaction was over, dissolving the reaction products in toluene, removing insoluble matter by filtration, and then heating up to 300° C. under a nitrogen atmosphere to distill off low molecular weight components, a polymer was obtained. Table 1 shows, of each polymer, the yield, number-average molecular weight ($\overline{Mn}$), absorptivity coefficient per 1 g of polymer at 300 nm in ultraviolet absorption spectrum: $K_{300}$ (l/g·cm), absorption end: $\lambda_{end}$ (nm), and carbon content. Additionally, for comparison, it also shows the result of reactions of the poly(dimethylsilane) only and of the pitch only. Further, the starting material pitch showed the $K_{300}$ of 69 and $\lambda_{end}$ of 630.

TABLE 1

| Poly(di-methylsilane) | Pitch (g) | Reaction Temperature (°C.) | Reaction Time (Hr.) | Yield (%) | $\overline{Mn}$ | $K_{300}$ (l/g·cm) | $\lambda_{end}$ (nm) | C (%) |
|---|---|---|---|---|---|---|---|---|
| 100 | 5 | 425 | 5 | 64.2 | 1,920 | 16 | 640 | 44.7 |
| 100 | 10 | 450 | 5 | 55.7 | 3,250 | 22 | 660 | 45.9 |

TABLE 1-continued

| Poly(di-methylsilane) | Pitch (g) | Reaction Temperature (°C.) | Reaction Time (Hr.) | Yield (%) | Mn | $K_{300}$ (l/g · cm) | $\lambda_{end}$ (nm) | C (%) |
| --- | --- | --- | --- | --- | --- | --- | --- | --- |
| 100 | 10 | 425 | 5 | 62.4 | 1,960 | 19 | 655 | 48.0 |
| 80 | 20 | 400 | 10 | 68.8 | 1,770 | 28 | 660 | 54.8 |
| 60 | 40 | 390 | 5 | 79.9 | 1,370 | 44 | 680 | 67.2 |
| 60 | 40 | 400 | 5 | 77.0 | 1,550 | 46 | 690 | 65.7 |
| 40 | 60 | 400 | 5 | 82.8 | 960 | 59 | 750 | 79.3 |
| 20 | 80 | 400 | 5 | 77.7 | 610 | 136 | 860 | 88.8 |
| 100 | 0 | 470 | 10 | 64.9 | 2,320 | 0 | — | 41.6 |
| 0 | 100 | 400 | 5 | 61.1 | 430 | 82 | 720 | 93.4 |

EXAMPLE 2

In 70 g of the poly(dimethylsilane) used in Example 1 and 10 g of hexamethyl disilane, were mixed 20 g of the pitch used in Example 1, and, setting the reaction tower temperature at 680° C., a reaction was carried out at a reaction temperature of 400° C. for 10 hours. After the reaction was over, dissolving the reaction products in toluene, removing insoluble matter by filtration, and then heating up to 300° C. under nitrogen atmosphere to distill off low molecular weight components, 65.0 g of a polymer were obtained. This polymer had an $\overline{M}n$ of 1,920, $K_{300}$ of 25, $\lambda_{end}$ of 660 and a carbon content of 55.2%.

EXAMPLE 3

In 50 g of the polysilane obtained by dechlorination polycondensation by using metallic Na of ethylmethyldichlorosilane in xylene, were mixed 50 g of the pitch used in Example 1 and, setting the reaction tower temperature at 400° C., a reaction was carried out at a reaction temperature of 400° C. for 5 hours. After the reaction was over, dissolving the reaction products in benzene, removing insoluble matter by filtration, and then heating up to 300° C. under nitrogen atmosphere to distil off low molecular weight components, 81.8 g of a polymer were obtained. This polymer had an $\overline{M}n$ of 920, $K_{300}$ of 52, $\lambda_{end}$ of 720 and a carbon content of 77.1%.

EXAMPLE 4

In 100 g of the poly(dimethylsilane) used in Example 1, was added a petroleum pitch (carbon content of 94.5% and toluene-insoluble matter of 59.1%) with the ratios shown in Table 2 and, setting the reaction tower temperature at 575° C., a reaction was carried out for 5 hours at the temperature of the reaction vessel shown in Table 2. After the reaction was over, dissolving the reaction products in toluene, removing insoluble matter by filtration, and then heating up to 300° C. under a nitrogen atmosphere to distil off low molecular weight components, a polymer was obtained. The results is shown in Table 2. This result shows the fact that the skeltons mainly comprising aromatic condensed rings of the polymer according to the present invention are derived from an organic solvent-soluble pitch and that an organic solvent-insoluble pitch which lowers the yields of the polymer of the present invention can be used only when that mixed in the polysilane is small in amount.

TABLE 2

| Pitch (g) | Reaction Temperature (°C.) | Yield (%) | Mn | $K_{300}$ (l/g · cm) | $\lambda_{end}$ (nm) | C (%) |
| --- | --- | --- | --- | --- | --- | --- |
| 10 | 425 | 61.3 | 2,020 | 17 | 640 | 45.0 |
| 20 | 425 | 16.2 | 2,480 | 9 | 650 | 47.0 |
| 20 | 450 | 16.9 | 2,370 | 7 | 650 | 46.2 |

EXAMPLE 5

To dichlro-dimethyl-silane, 30 mole % of diphenyldichlorosilane were added and dechlorination polycondensation was effected by using metallic Na in xylene. Twenty grams of the thus obtained polysilane were mixed with 80 g of toluene-soluble matter (number average molecular weight: 280, and carbon content: 91.5%) of a coal-tar pitch and, setting the reaction tower temperature at 600° C., a reaction was carried out at a reaction temperature of 350° C. for 10 hours. After the reaction was over, dissolving the reaction products in toluene, removing insoluble matter by filtration, and then heating up to 300° C. under a nitrogen atmosphere to distil off low molecular weight components, 72.1 g of a polymer were obtained. This polymer had an Mn of 1,830, $K_{300}$ of 150, $\lambda_{end}$ of 790, and a carbon content of 90.2%.

EXAMPLE 6

Poly(dimethylsilane) obtained by dechlorination polycondensation by using metallic Na of dichlorodimethylsilane in xylene, was mixed with toluene-soluble matter (number-average molecular weight: 320, and carbon content: 92.1%) of a petroleum pitch with various ratios and, setting the reaction tower temperature at 575° C., co-pyrolytic condensation of the mixture was carried out at various temperatures in a reaction vessel (reaction temperatures) for various reaction times. After the reaction was over, dissolving the reaction products in toluene, removing insoluble matter by filtration, and then heating up to 300° C. under a nitrogen atmosphere to distil off low molecular weight components, respective polymers were obtained. Synthesis conditions for the respective polymers are shown in Table 3. These polymers were melted by heating at 300°~350° C. and spun from a spinneret with an orifice of 500 μm in diameter at a spinning speed of 500 m/min., into a fiber. The spun fiber was then infusibilized by heating in air, at a rate of temperature rise of 10° C./hour, up to a predetermined temperature which was kept for 1 hour and, thereafter heat-treated by heating in a vacuum, at a rate of temperature rise of 100° C./hour, up to 1,200° C. which was kept for 1 hour. Thus, a fiber having a diameter of 10~15 m was obtained. The mechanical properties of the fiber were determined with a gage length of 25 mm and a crosshead speed of 2 mm/min. The volume resistivity was also determined. The infusibilizing temperatures, mechanical properties, volume resistivities and chemical analysis values of the fiber (Si, C, O only) are shown in Table 3.

TABLE 3

| No. | Poly(di-methyl-silane) (g) | Pitch (g) | Reaction Temperature | Reaction Time (hr.) | Infus-ibilizing Temperature (°C.) | Tensile Strength (GPa) | Tensile Modulus of Elasticity (GPa) | Volume Resistivity ($\Omega \cdot$ cm) | Chemical Analysis Value (wt %) | | |
|---|---|---|---|---|---|---|---|---|---|---|---|
| | | | | | | | | | Si | C | O |
| 1 | 100 | 5 | 425 | 5 | 220 | 2.17 | 148 | 1.30 | 51.1 | 40.0 | 8.9 |
| 2 | 100 | 10 | 425 | 5 | 200 | 2.39 | 152 | 0.18 | 48.1 | 44.5 | 7.4 |
| 3 | 80 | 20 | 400 | 10 | 180 | 1.82 | 103 | $5.8 \times 10^{-2}$ | 36.7 | 56.1 | 7.2 |
| 4 | 60 | 40 | 400 | 5 | 220 | 1.81 | 85 | $3.7 \times 10^{-2}$ | 24.4 | 63.3 | 12.3 |
| 5 | 40 | 60 | 400 | 5 | 230 | 1.54 | 90 | $3.0 \times 10^{-2}$ | 16.2 | 70.1 | 13.7 |
| 6 | 20 | 80 | 400 | 5 | 250 | 1.46 | 65 | $2.7 \times 10^{-2}$ | 9.1 | 80.9 | 10.0 |

EXAMPLE 7

The polymer No. 4 synthesized in Example 4 was spun and infusibilized in the same manner as Example 6. The infusibilized fiber was heated in an argon gas stream of 200 cc/min., at a rate of temperature rise of 100° C./hr., up to 1,000°, 1,200° or 1,500° C. at which temperature a heat treatment was effected for 1 hour. Of the thus obtained fibers, the results of respective mechanical properties, volume resistivities and chemical analysis values are shown in Table 4.

TABLE 4

| Heat-treating Temperature (°C.) | Tensile Strength (GPa) | Tensile Modulus of Elasticity (GPa) | Volume Resistivity ($\Omega \cdot$ cm) | Chemical Analysis Value (wt %) | | |
|---|---|---|---|---|---|---|
| | | | | Si | C | O |
| 1,000 | 1.60 | 83 | $3.3 \times 10^{-1}$ | 28.1 | 60.0 | 11.5 |
| 1,200 | 1.81 | 85 | $6.0 \times 10^{-2}$ | 28.5 | 59.7 | 11.7 |
| 1,500 | 0.54 | 47 | $2.4 \times 10^{-3}$ | 31.2 | 63.6 | 5.1 |

EXAMPLE 8

The polymer No. 6 synthesized in Example 6 was spun in the same manner as Example 6. The spun fiber was then infusibilized under a nitrogen gas atmosphere by irradiating with electron rays of $1.5 \times 10^9 \gamma$, thereafter heated in an argon gas stream of 200 cc/min. up to 700° C. and then further heated, under a tension of about 4 kg/mm$_2$, up to 1,200°, 2,000° or 2,500° C. at which temperature a heat treatment was effected for 1 hour. Of the thus obtained fibers, the results of mechanical properties, volume resistivities and chemical analysis values are shown in Table 5.

TABLE 5

| Heat-treating Temperature (°C.) | Tensile Strength (GPa) | Tensile Modulus of Elasticity (GPa) | Volume Resistivity ($\Omega \cdot$ cm) | Chemical Analysis Value (wt %) | | |
|---|---|---|---|---|---|---|
| | | | | Si | C | O |
| 1,200 | 1.85 | 76 | $2.2 \times 10^{-2}$ | 10.2 | 87.4 | 2.1 |
| 2,000 | 1.23 | 165 | $1.5 \times 10^{-2}$ | 11.1 | 88.0 | 0.7 |
| 2,500 | 0.97 | 160 | $0.7 \times 10^{-3}$ | 11.5 | 88.2 | 0.1 |

EXAMPLE 9

Seventy grams of poly(dimethylsilane) used in Example 6 and 10 g of hexamethyldisilane were mixed with 20 g of the pitch used in Example 6, and the mixture was co-pyrolytically condensed at a reaction tower temperature of 680° C. and a reaction temperature of 400° C., for a reaction time of 10 hours. After the reaction was over, the same treatments as Example 6 were conducted and the obtained polymer was denoted by No. 7. Alternatively, 50 g of a polysilane obtained by dechlorination polycondensation by using metallic Na of ethylmethyldichlorosilane in xylene, were mixed with 50 g of the pitch used in Example 6 and, the mixture was co-pyrolytically condensed at a reaction tower temperature of 400° C. and a reaction temperature of 400° C., for a reaction time of 5 hours. After the reaction was over, a toluene solution of the reaction products was prepared from which insoluble matter was removed by filtration and then low molecular weight components having a boiling point below 300° C./1 mm Hg were removed by vacuum distillation, and the obtained polymer was denoted by No. 8. Further, 100 g of the poly(dimethylsilane) used in Example 1 were mixed with 10 g of a petroleum pitch (carbon content: 94.5%, and toluene-insoluble matter: 59.1%) and co-pyrolytic condensation was carried out in the same manner as that for polymer No. 1, to obtain a polymer which was denoted by No. 9. Furthermore, 20 g of a polysilane obtained by adding dichlorodimethyl silane to 30 mole % of diphenyldichlorosilane and effecting dechlorination polycondensation in xylene by using metallic Na, were mixed with 80 g of toluene-soluble matter (average molecular weight: 280, and carbon content: 91.5%) of a coal-tar pitch, the mixture was co-pyrolytically condensed at a reaction tower temperature of 600° C. and a reaction temperature of 350° C., for a reaction time of 10 hours, and after the reaction was over, the same treatment as Example 6 was conducted to obtain a polymer that was denoted by No. 10.

These polymers were melted by heating at 280°~350° C. and spun from a spinneret with an orifice of 500 μm in diameter at a spinning speed of 300 m/min., into fibers. The spun fibers were then heated in air, at a rate of temperature rise of 5° C./hour, up to a predetermined temperature at which an infusibilization was effected for 2 hours. Thereafter, the infusibilized fibers were heated in a nitrogen gas stream of 200 cc/min., at a rate of temperature rise of 100° C./hr., up to 1,200° C. and at which temperature a heat treatment was effected for 1 hr. The obtained fibers had a diameter of single filament of 12~18 μm. Of these fibers, the results of mechanical properties, volume resistivities and chemical analysis values are shown together with the infusibilizing temperatures in Table 6.

TABLE 6

| No. | Heat-treating Temperature (°C.) | Tensile Strength (GPa) | Tensile Modulus of Elasticity (GPa) | Volume Resisitivity (Ω·cm) | Chemical Analysis Value (wt %) | | |
|---|---|---|---|---|---|---|---|
| | | | | | Si | C | O |
| 7 | 200 | 2.00 | 110 | $7.5 \times 10^{-2}$ | 33.0 | 54.1 | 12.9 |
| 8 | 220 | 1.32 | 79 | $2.5 \times 10^{-2}$ | 17.0 | 72.1 | 10.9 |
| 9 | 210 | 2.89 | 174 | 6.10 | 49.8 | 41.0 | 9.2 |
| 10 | 130 | 1.73 | 51 | $8.3 \times 10^{-2}$ | 5.6 | 89.6 | 4.8 |

EXAMPLE 10

Fibers manufactured from the polymer No. 6 in Example 6 were heat-treated in air at 550° C. and 600° C. for 1 hour, respectively, and changes in mechanical properties by oxidation of the fibers were investigated. The results is given in Table 7. This results shows the fact that, though the mechanical properties are lowered at the initial stage of the oxidation, thereafter they approach a constant value and the oxidation is restrained from progressing farther.

TABLE 7

| Heat-treating Temperature (°C.) | Tensile Strength (GPa) | Tensile Modulus of Elasticity (GPa) |
|---|---|---|
| Not treated | 1.46 | 65 |
| 550 | 1.12 | 57 |
| 600 | 1.08 | 58 |

[INDUSTRIAL APPLICABILITY]

Heretofore, low boiling substances produced in great quantities by pyrolysis of polysilanes and low boiling fractions contained in pitches have caused the considerably low yields in the reactions of this kind, nevertheless, according to the process for manufacturing organopolyarylsilanes of the present invention, since the lowering of yields can be prevented by reacting these low boiling substances in a gaseous phase, refluxing to a liquid phase, the objective organopolyarylsilanes can be efficiently obtained in extremely high yields. Besides, the present invention has succeeded in using polysilanes having any molecular weight and pitches as starting materials, so that it greatly contributes towards an effective utilization of the pitches.

Further, in the present invention, even if an increase in molecular weight or the number of the aromatic rings of the pitch component occurs, it can be restrained to such an extent that solubilities in organic solvents are not lost, by exterously utilizing the function of polysilanes in the reaction between pyrolysates of the polysilanes and of the pitches, so that solvent insoluble substances are little produced and, therefore, the lowering of the yields can be prevented same as the above.

Furthermore, the products, i.e., the condensed aromatic ring containing organopolyarylsilanes are organic solvent soluble and heat-melting, and since the percentage of residue is high when heat-treated under a non-oxidizing atmosphere, they can be employed as a precursor for carbon-ceramic composite. Additionally, since the carbon content can be arbitrarily controlled by adequately selecting the amount of the starting materials to be mixed, etc., various new functions as well as the development of fields of their use are much expected of the final products manufactured from these precursors.

Moreover, as explained above, since the SiC—C based continuous inorganic fibers of the present invention are excellent in heat resistance and oxidation resistance, have a volume resistivity of $10 \sim 10^{-3}$ Ω·cm and exhibit excellent mechanical properties, the uses in diversified fields are conceivable such as, beginning with reinforcements for composite materials wherein these properties are utilized, electric or electronic materials, and heat-resistant materials or structural components relating to aerospace and aviation.

We claim:

1. An organopolyaromaticsilane which is characterized in that aromatic ring segments derived from a pitch that is soluble in an organic solvent and having a skeleton mainly comprising an aromatic condensed ring structure and organosilane segments having a skeleton mainly comprising carbosilane and polysilane structures are randomly bonded to each other with a silicon-carbon linkage intervening therebetween and further characterized by being soluble in an organic solvent wherein the polysilane is a linear, cyclic or ramified polymer having a main chain structure represented by the general formula,

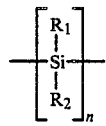

wherein n is an integer not smaller than 2, and $R_1$ and $R_2$ which are the same or different, are hydrogen, halogen, alkyl having up to 6 carbon atoms or aryl having up to 12 carbon atoms, respectively.

2. An organopolyaromaticsilane as claimed in claim 1, wherein said organic solvent is at least one aromatic solvent selected from the group consisting of benzene, toluene, xylene and tetrahydrofuran.

3. An organopolyaromaticsilane as claimed in anyone of the foregoing claims, which further has a number-average molecular weight of 500~10,000.

4. An organopolyaromaticsilane as claimed in claim 3, wherein said number-average molecular weight is 600~4,000.

5. A process for manufacturing an organopolyaromaticsilane, which is characterized by mixing 100 parts by weight of a polysilane which is a linear, cyclic or remified polymer having a main chain structure represented by the general formula,

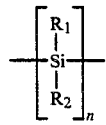

wherein n is an integer not smaller than 2, and $R_1$ and $R_2$, which are the same or different, are hydrogen, halogen, alkyl having up to 6 carbon atoms or aryl having up to 12 carbon atoms, respectively with 2~500 parts by weight of a pitch that is soluble in an organic solvent, and subjecting the mixture to a co-pyrolytic condensation reaction by heating under an inert atmosphere wherein the co-pyrolytic condensation reaction is performed in a liquid phase at 300°~500° C. and in a gaseous phase at 300°~800° C.

6. A process for manufacturing an organopolyaromaticsilane as claimed in claim 5, wherein at least 50% of $R_1$ and $R_2$ are methyl groups.

7. A process for manufacturing an organopolyaromaticsilane as claimed in claim 5 wherein said co-pyrolytic condensation reaction is performed under normal pressure.

8. A process for manufacturing an organopolyaromaticsilane as claimed in claim 7 wherein said organic solvent is at least one aromatic solvent selected form the group consisting of benzene, toluene, xylene and tetrahydrofuran.

9. An SiC—C based continuous inorganic fiber which is characterized by being produced by spinning an organic solvent soluble organoplyaromaticsilane into a fiber, said organopolyaromaticsilane comprising aromatic ring segments having a skeleton mainly comprising an aromatic condensed ring structure and organosilane segments having a skeleton mainly comprising carbosilane and polysilane structures, randomly bonded to each other with a silicon-carbon linkage intervening therebetween and then after infusibilizing, heat-treating said fiber under a non-reactive atmosphere at a temperature between 800° C. and 3,000° C.

wherein the polysilane is a linear, cyclic or ramified polymer having a main chain structure represented by the general formula,

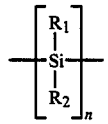

wherein n is an integer not smaller than 2, and $R_1$ and $R_2$, which are the same of different, are hydrogen, halogen, an alkyl group having up to 6 carbon atoms or an aryl group having up to 12 carbon atoms, respectively.

10. An SiC—C based continuous inorganic fiber as claimed in claim 9, wherein said aromatic ring segments are derived from a pitch that is soluble in an organic solvent.

11. An SiC—C based continuous inorganic fiber as claimed in claim 9, wherein said organic solvent is at least one aromatic solvent selected from the group consisting of benzene, toluene, xylene and tetrahydrofuran.

12. An SiC—C based continuous inorganic fiber as claimed in claim 11, wherein said organopolyaromaticsilane has a number-average molecular weight of 500~10,000.

13. An SiC—C based continuous inorganic fiber as claimed in claim 12, wherein said organopolyaromaticsilane is produced by mixing 100 parts by weight of a polysilane which is a linear, cyclic or ramified polymer having a main chain structure represented by the general formula.

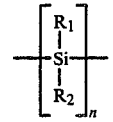

wherein n is an integer not smaller than 2, and $R_1$ and $R_2$, which are the same or different, are hydrogen, halogen, an alkyl group having up to 6 carbon atoms or an aryl group having up to 12 carbon atoms, respectively with 2~500 parts by weight of an organic solvent soluble pitch and subjecting the mixture to a co-pyrolytic condensation reaction by heating under an inert atmosphere;

wherein the co-pyrolytic condensation reaction is performed in a liquid phase at 300°~500° C. and in a gaseous phase at 300°~800° C.

14. An SiC—C based continuous inorganic fiber as claimed in claim 13, wherein at least 50% of $R_1$ and $R_2$ are methyl groups.

15. An SiC—C based continuour inorganic fiber as claimed in claim 13, wherein said copyrolytic condensation reaction is per formed both in liquid and gaseous phases.

16. An SiC—C based continuous inorganic fiber as claimed in claim 15, wherein said reaction in the liquid phase is performed at 300°~500° C. and that in the gaseous phase is performed at 300°~800° C.

17. An SiC—C based continuous inorganic fiber as claimed in claim 15, wherein said co-pyrolytic condensation reaction is performed under normal pressure.

18. An SiC—C based continuous inorganic fiber as claimed in claim 17, wherein the heat-treating temperature is at the highest 1,800° C.

19. An SiC—C based continuous inorganic fiber as claimed in claim 18, wherein said heat-treating temperature is at the highest 1,400° C.

20. An SiC—C based continuous inorganic fiber as claimed in claim 9, which comprises molecules having, as main structural components, an amorphous and/or crystalline carbon and an amorphous and/or crystalline SiC; has a composition comprising 5~55% by weight of silicon, 40~95% by weight of carbon and 0.01~15% by weight of oxygen; is excellent in heat resistance and oxidation resistance; and exhibits a volume resistivity of $10 \sim 10^{-3}$ Ω·cm.

21. An SiC—C based continuous inorganic fiber as claimed in claim 20, which is substantially free from α—SiC crystals.

22. An SiC—C based continuous inorganic fiber as claimed in claim 20 or 21, which comprises graphite crystallites not exceeding 100 Å in size.

23. An SiC—C based continuous inorganic fiber as claimed in claim 20, wherein said structural components, the carbon and SiC are both amorphous.

* * * * *